United States Patent [19]

Guainazzi et al.

[11] 4,207,217
[45] Jun. 10, 1980

[54] HEAT MELTING ADHESIVE

[75] Inventors: Giancarlo Guainazzi, Milan; Italo Albini, Pavia, both of Italy

[73] Assignee: Chem-Plast S.p.A., Milan, Italy

[21] Appl. No.: 917,630

[22] Filed: Jun. 21, 1978

Related U.S. Application Data

[63] Continuation of Ser. No. 774,004, Mar. 3, 1977, abandoned.

[30] Foreign Application Priority Data

Dec. 20, 1976 [IT] Italy ............................ 306354 A/76

[51] Int. Cl.² .......................... C08G 69/26; C09J 3/16; C09J 3/26; C09J 5/10
[52] U.S. Cl. .................................. 260/18 N; 156/331; 156/332; 260/28 R; 427/412; 428/473; 428/474
[58] Field of Search ............... 260/18 N, 404.5 PA, 260/28; 156/331, 332; 427/412; 428/473, 474

[56] References Cited

U.S. PATENT DOCUMENTS

| | | | |
|---|---|---|---|
| 2,450,940 | 10/1948 | Cowan et al. | 260/18 N |
| 2,824,848 | 2/1958 | Wittcoff | 260/18 N |
| 3,396,180 | 8/1968 | Floyd et al. | 260/18 N |
| 3,449,273 | 6/1969 | Kettenring et al. | 260/18 N |
| 3,499,853 | 3/1970 | Griebsch et al. | 260/18 N |
| 3,550,806 | 12/1970 | Peerman et al. | 156/332 |
| 3,644,245 | 2/1972 | Flanagan et al. | 260/28 |
| 3,781,234 | 12/1973 | Drawert et al. | 260/18 N |
| 3,787,342 | 1/1974 | Berry et al. | 260/28 |
| 3,859,234 | 1/1975 | Peerman | 260/18 N |
| 4,062,820 | 12/1977 | Mitchell et al. | 260/18 N |

OTHER PUBLICATIONS

Skeist, *Handbook of Adhesives*, Van Nostrand Reinhold Company., N.Y., N.Y., 1962, pp. 425–430.

*Primary Examiner*—Ronald W. Griffin
*Attorney, Agent, or Firm*—Karl W. Flocks

[57] ABSTRACT

A hot melt adhesive is disclosed, to be used in gluing guns, and consisting of a polyamide resin obtained by polycondensation of an aliphatic diamine with a fatty acid mixture, said fatty acid mixture consisting of unsaturated fatty acid monomers and polymers with a maximum dimer content of 80% by weight to which are added, in a quantity of not less than 10% by weight of the fatty acid mixture, aliphatic bicarboxylic acids and/or their esters with a polyethylene chain containing 6 to 10 carbon atoms. As an alternative a quantity of not less than 4% by weight of the fatty acid mixture, aromatic bicarboxylic acids and/or their esters, or mixtures of these latter with aliphatic bicarboxylic acids, can be added to the mixture.

10 Claims, No Drawings

HEAT MELTING ADHESIVE

This is a continuation of application Ser. No. 774,004, filed Mar. 3, 1977, now abandoned.

This invention relates to the preparation of hot melt adhesives in the form of a continuous strand and particularly suitable for feeding automatic devices for assembling footwear and leather and simulated leather objects.

Thermoplastic polyester-based melting adhesives in the form of a continuous strand for assembling footwear are already available commercially, and although they set rapidly and allow the footwear assembly devices to work at high operating speeds, they do not have sufficient adhesive force or most of the materials used in footwear manufacture.

Melting adhesives in the form of a continuous strand for assembling footwear are also available commercially based on fatty acid polyamide resins which, although they have good adhesive properties for the various materials used in manufacturing footwear, have setting speeds which are considerably lower than those for thermoplastic polyester-based adhesives, with consequently serious limitations on the operating speed of the assembly devices.

The main object of the present invention is to provide a heat hot melt adhesive, in particular in the form of a continuous strand, which is substantially free from the aforegoing disadvantages and problems of both the traditional types of adhesive.

This object is substantially attained by an adhesive of the type consisting of a polyamide resin obtained by polycondensation of an aliphatic diamine with a fatty acid mixture, where said fatty acid mixture consists of unsatrated fatty acid monomers and polymers with a maximum dimer content of 80% by weight, and to which are added, in a quantity of not less than 10% by weight of the fatty acid mixture, aliphatic bicarboxylic acids and/or their esters with a polyethylene chain containing 6 to 10 carbon atoms, or, in a quantity of not less than 4% by weight of the fatty acid mixture, aromatic bicarboxylic acids and/or their esters, or mixtures of these latter with aliphatic bicarboxylic acids of the previously indicated type.

The present polyamide adhesives in the form of a continuous strand have sufficient flexibility to enable the strand to be wound on a reel, high adhesiveness towards the various materials used in manufacturing footwear and a setting speed equal and even greater than that of the thermoplastic polyester-based adhesives. Consequently they can be used in automatic footwear assembly devices at operating speeds equal to those obtained with thermoplastic polyester-based adhesives.

The adhesives according to the present invention are prepared by the known methods for preparing polyamides from fatty acids, by condensing the amine with the acids at a temperature of 180° to 250° C.

The expression "fatty acids" includes natural and synthetic monobasic aliphatic acids with ethylene unsaturation, containing 8 to 24 carbon atoms.

The term "fatty acid polymers" indicates polymerised acids obtained from fatty acids by both catalytic and non-catalytic polymerisation methods.

The mixture of unsaturated fatty acid monomers and polymers used in the preparation has a composition within the following limits:

| fatty acid monomers | 5–10% |
| fatty acid dimers | 75–80% |
| fatty acid polymers beyond the dimer | 15–10% |

The term "aliphatic bicarboxylic acids" is intended to encompass adipic, pimelic, suberic, azelaic and sebacic acids. The term "aromatic bicarboxylic acids" is intended to encompass phthalic acid or its anhydride, isophthalic acid and terephthalic acid.

Up to 6% of natural or synthetic waxes (such as carnauba, paraffin or polyethylene waxes and the like) may be added to the adhesives according to the invention to provide self-lubrication both during extrusion into the strand and during the use of the strand obtained.

The invention is illustrated by the non-limiting examples given hereinafter.

EXAMPLE 1

A reactor is fed with 1900 kg of the mixture of fatty acid monomers and polymers and 330 kg of azelaic acid, and is heated under a nitrogen atmosphere to 120° C., and then 300 kg of ethylene diamine are slowly added under agitation. After the addition, the temperature is raised to reach 240° C. in two hours. The temperature is maintained and the pressure is reduced to 20–40 mm Hg, until the reaction product has attained a viscosity of about 30 poises in the molten state at 220° C. 3% of the mixture weight is then added of an antioxidant based on alkyl esters of 3,5-ditertiarybutylhydroxyphenylpropionic acid and the mixture is allowed to homogenise. The adhesive thus obtained has the following characteristics:

| Softening point (ball and ring) | 194° C. |
| Viscosity at 220° C. | 32 poises |
| Amine number | 4 |
| Acid number | 8 | and is extruded in a screw extruder to give a continuous strand of the required diameter, then cooled and wound on spools.

EXAMPLE 2

Proceeding as in example 1, an adhesive is prepared with 1900 kg of a mixture of fatty acid monomers and polymers, 350 kg of serbacic acid and 300 kg pf ethylene diamine. The adhesive is stabilised with antioxidant as in example 1 and has the following characteristics:

| Softening point (ball and ring) | 215° C. |
| Viscosity at 220° C. | 31 poises |
| Amine number | 3 |
| Acid number | 7 |

It is extruded as in example 1.

EXAMPLE 3

Proceeding as in example 1, an adhesive is prepared with 1840 kg of a mixture of fatty acid monomers and polymers, 270 kg of adipic acid and 300 kg of ethylene diamine. The adhesive is stabilised with antioxidant as in example 1, and has the following characteristics:

| Softening point (ball and ring) | 220° C. |
| Viscosity at 220° C. | 32 poises |

-continued

| | |
|---|---|
| Amine number | 3.5 |
| Acid number | 7.5 |

It is extruded as in example 1.

EXAMPLE 4

Proceeding as in example 1, an adhesive is prepared with 2550 kg of a mixture of fatty acid monomers and polymers, 110 kg of methyl terephthalate and 300 kg of ethylene diamine. The adhesive is stabilised with antioxidant as in example 1 and has the following characteristics:

| | |
|---|---|
| Softening point (ball and ring) | 205° C. |
| Viscosity at 220° C. | 38 poises |
| Amine number | 3.3 |
| Acid number | 6.5 |

It is extruded as in example 1.

EXAMPLE 5

The adhesive is prepared as described in example 1. At the end of the operation with the mass still molten, a quantity of polyethylene wax (BASF wax type AM) is added equal to 2% of the weight of the mass, and the mixture is kept agitated for about 15 minutes. The adhesive has the same characteristics as in example 1, and is extruded in the same manner.

What is claimed is:

1. a hot melt adhesive in the form of a continuous strand, suitable for feeding assembling machinery for footwear, hide and hide-like laminated articles, consisting of a polyamide resin having a softening point (as measured by the ring and ball method) higher than 194° C. and a hot melt viscosity at 220° C. of at least 31 poises, the polyamide resin being prepared by condensing, at a temperature of between 180° C. and 250° C.,
    (1) an acid consisting of:
        (a) a mixture of monomeric and polymeric fatty acids, having a monomer content of 5-10%, a dimer content 75-80%, and a higher polymer content of 10-15%, the mixture being prepared by polymerization of monocarboxylic acids having an unsaturated ethylene chain containing 8 to 24 carbon atoms and
        (b) bicarboxylic acids, having the formula HOOC—R—COOH, wherein R is an aliphatic hydrocarbon radical having 6 to 10 carbon atoms, and/or esters thereof, in a proportion of at least 10% by weight of the mixture under (a) or aromatic bicarboxylic acids and/or esters thereof, in a proportion of at least 4% by weight of the mixture (a), with
    (2) an essentially equivalent amount of a diamine reactant.

2. An adhesive according to claim 1, wherein the mixture 1 (a) is obtained by polymerizing monocarboxylic acids having an unsaturated ethylene chain containing 18 carbon atoms.

3. An adhesive according to claim 1, wherein the copolymerizing di-acid component 1 (b) is azelaic acid.

4. An adhesive according to claim 3, wherein the amine component is ethylene diamine.

5. An adhesive according to claim 4 wherein the aromatic acid is a member selected from the group consisting of phthalic acid or its anhydride, isophthalic acid and terephthalic acid.

6. An adhesive according to claim 1, wherein the ethylene diamine is in an amount stoichiometrically corresponding to the acid reactant.

7. An adhesive according to claim 1 to which a quantity of up to 6% of natural or synthetic waxes is added.

8. An adhesive to claim 1, wherein the continuous strand is obtained by extrusion through a die.

9. An adhesive strand in acordance with claim 1, wound on a reel.

10. In a method of laminating footwear, hide and hide-like articles using a hot-melt adhesive, the improvement wherein said hot melt adhesive is a continuous strand as recited in claim 1.

* * * * *